United States Patent Office 3,809,754
Patented May 7, 1974

3,809,754
METHOD OF TREATING DISEASES OF THE MUCOUS MEMBRANE USING COMPOUNDS OF A THIAZOLIDINE CARBOXYLIC ACID AND PHARMACEUTICAL PREPARATIONS THEREOF
Francois Robert Bertrand, Geneva, Switzerland, assignor to Medial de Toledo & Cie, Geneva, Switzerland
No Drawing. Continuation-in-part of abandoned application Ser. No. 889,293, Dec. 30, 1969. This application Dec. 30, 1971, Ser. No. 214,479
Claims priority, application France, Dec. 31, 1968, 182,571
Int. Cl. A61k 27/00
U.S. Cl. 424—270                                8 Claims

ABSTRACT OF THE DISCLOSURE

Mucolytic and antitussive medicament comprising derivatives of thiazolidine carboxylic acid of the formula,

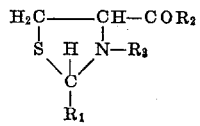

wherein $R_1$ represents hydrogen, an alkyl, aryl, hydroxy, alkyloxy, aryloxy, heterocyclic, amino or carboxylic acid or ester, all of the these groups capable of being substituted, whether substituted or not;

$R_2$ represents an amino, hydroxy, alkyloxy, aryloxy, heterocyclic, mono- and dialkylamino, $-NHCH_2OH$, or morpholine radical, all of these groups capable of being substituted, whether substituted or not; and $R_3$ represents hydrogen, an alkyl, including cycloalkyl, heterocyclic, aryl, carboxylic acid or carboxylic acid ester group.

---

This is a continuation-in-part of my copending U.S. application Ser. No. 889,293, filed Dec. 30, 1969 and now abandoned.

The invention relates to a method of treating diseases of the mucous membrane and pharmaceutical compositions therefor. In particular, the present invention concerns treatment of diseases of the mucous membrane with certain thiazolidine carboxylic acids.

It has been found that certain homologues and derivatives of thiazolidine carboxylic acid have physiological properties, particularly as an antitussive and mucolytic agent. These compounds have the formula,

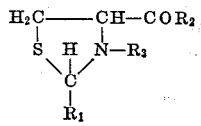

wherein $R_1$ represents hydrogen, an alkyl, aryl, hydroxy( alkyloxy, aryloxy, heterocyclic, amino or carboxylic acid or ester radical, all of these groups capable of being substituted, whether substituted or not;

$R_2$ represents an amino, hydroxy( alkyloxy, aryloxy, heterocyclic, mono- or dialkylamino, $-NHCH_2OH$, or morpholine radical, all of these groups capable of being substituted, whether substituted or not; and $R_3$ represents hydrogen, an alkyl, heterocyclic, aryl, carboxylic acid or carboxylic acid ester group.

In the above formula, alkyl includes straight, branched and cyclic alkyl groups; however, the alkyl groups are preferably lower alkyl groups containing up to 6 carbon atoms and more preferably up to 4 carbon atoms. The cyclic group including heterocyclic groups are preferably those containing 5 or 6 members in the ring and aryl is preferably phenyl.

Even more preferably, in the formula above, $R_1$ is hydrogen, methyl or ethyl; $R_2$ is OH, methyl, ethyl, amino, methylamino and dimethylamino or 2-aminothiazolidines and $R_3$ is H or methyl.

It is also understood that the non-toxic salts of the thiozolidine derivatives, such as the hydrochloride of ester derivatives and the sodium salt of the acid, are included within the compounds used in accordance with the present invention.

The envisaged compounds can be prepared by reacting thioamino acids where $-SH$ and $-NH_2$ groups are fixed on two neighboring carbons with an aldehyde in such a way as to induce closure to form a thiazolidine nucleus. This procedure can usually be carried out in water or sometimes in an alcoholic medium.

EXAMPLES OF PREPARATION OF THE THIOZOLIDINE COMPOUNDS

Example 1

Preparation of 2-methylthiazolidine-4-carboxylic acid (Product "MG 238")

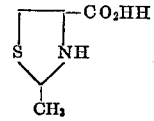

by the reaction:

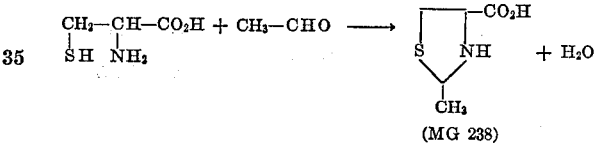

(MG 238)

PROCESS

A current of nitrogen is circulated in a 2 l. reactor, fitted with an agitator, a refrigerant, a thermometer and a decanting flask of 250 ml. with a pressure equalizer tube, in order to eliminate the oxygen in the air and to carry out the preparation in a nitrogen atmosphere. 1-cysteine base (2.23 M) Rem-1 in an amount of 270.0 g. and 1700 g. distilled water are successively introduced into the reactor.

The incomplete solution of cysteine is agitated at 15° C. means of the decanting flask, 100 g. of acetaldehyde (2.27 M) Rem. 2 is added slowly under agitation between 15–20° C. for ¾ hr. to 1 hr., cooling with cold water if necessary. The cysteine dissolves and agitation is continued for 3 hr. at 20° C. and then 1 hr. at 40° C. to effect the reaction. It is left overnight at normal temperature. A slight precipitation occurs and the mixture is filtered until clear with a Buchner filter pH 3.8–4.0.

The reaction is decanted into a 3 l. flask and 850 ml. of water is distilled in a vacuum. To the residue, 1 liter of absolute alcohol is added slowly and stirred. This is agitated then left to crystallize in a refrigerating machine.

The product crystallizes slowly in the form of a voluminous precipitate. It is passed through a large Buchner filter of 24 cm., drained carefully, and then washed with 3 portions of 100 ml. of absolute alcohol. The precipitate is dried in a vacuum at 70° C., to constant weight. The substance is next sieved and drying is carried out by means of a $CaCl_2$ dessicator in a vacuum.

Characteristics of the product: Weight, 275 g., fusion, 158 to 160 degrees; yield, th. 328.2 g. (2.23 M) 84%.

The product is white, finely crystalline, forming a felt of light and columinous crystals.

RECRYSTALLIZATION 2-methylthiazolidine-4-carboxylic acid in an amount of 20 g. is dissolved in 80 ml. of distilled water at 90 degrees and filtered hot in the presence of a small amount of carbon; then 400 ml. of absolute alcohol is added. It is left to crystallize overnight in a refrigerating machine. After filtering, washing and drying in a vacuum at 70° C. 12 g. of the product are obtained; fusion, 163 to 164° C.; yield, 60%.

SOLUBILITY

The 2-methylthiazolidine 4-carboxylic acid is soluble in the proportion of 1 g. 12 ml. of water at 20° C. or 1 g. in 40 ml. of methanol or ethanol at 20° C.

REMARKS

1. The l-cysteine base is prepared from the l-cysteine hydrochloride according to the usual method.
2. The acetaldehyde, which has a boiling point of 21°, is contained in a sealed flask of 100 g. capacity, as well as the decanting flask, and must be cooled for several hours in a refrigerating machine before decanting in order to avoid too great a loss. The decanting flask with a tubing for pressure equalization must be hermetically closed with a ground glass stopper during the introduction of the acetaldehyde.

EXAMPLES 2 AND 3

Preparation of MG 238 ester and amide

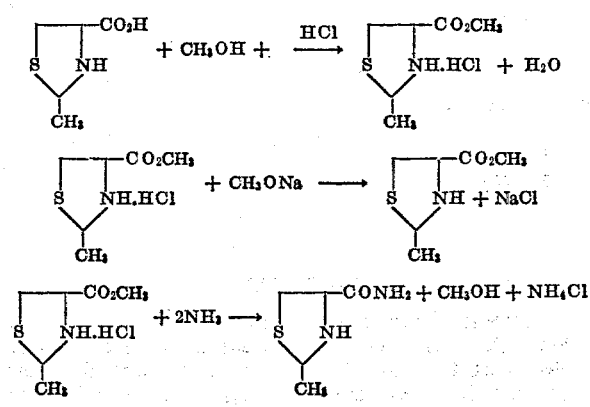

Preparation of the methyl ester of MG 238

A suspension of 100 g. of product No. 238 is saturated for 6 to 8 hours at 20° with a gaseous current of hydrochloric acid in 1 liter of methanol. Gradually the mixture becomes homogenous. It is then heated to reflux and left overnight; dry concentration is carried out in a vacuum. The residue is treated with 500 ml. of ether and then left to crystallize. Thus, 134 g. of the hydrochloride of the methyl ester is obtained.

To prepare the ester base, 20 g. of this hydrochloride in 100 ml. of methanol with a solution of 2.3 g. of sodium methylate, a dry concentration is made in a vacuum. The oily residue is distilled in a high vacuum at a pressure of 1 mm. Hg and 15 g. of ester base is obtained.

Preparation of the amide of product 238

A solution of 100 g. of the hydrochloride of the methyl ester of 238 is saturated at 0° to 10° C. with a current of dry ammonia in 1 liter of methanol. The saturation lasts about 6 hours. It is left in the ambient temperature for two days. It is heated for 1 hour to 30°, then the excess ammonia and the methanol are distilled in a vacuum. The dry residue is treated by boiling with 250 ml. of isopropanol. The ammonium chloride is filtered and the solution is left in a refrigerating machine whereby the amide crystallizes. Thus, 60 g. of crystalline product are obtained.

METHOD OF ANALYSIS

These compounds can be analyzed quantatively, either by potentiometric measurement with 1 N perchloric acid or by alkali-acidimetric measurement with tetrabutyl ammonium, 1 N hydroxide and with methyl violet as an indicator.

TOXICOLOGICAL PROPERTIES

Generally, these compounds evidence only relatively slight toxicity, the DL 50 in mice being higher, normally to 500–600 mg./kg. of bone as an oral dose and to 300–400 mg./kg. by subcutaneous injection. One daily dose, administered as continuous treatment over 60 days to rats at a dose of 300 mg./kg. of bone did not lead to toxic effects and various examinations, either of blood formula or on the different organs taken from the animal showed no secondary effects from this treatment.

PHARMACOLOGICAL PROPERTIES

A series of these substances have been tested "in vitro" to determine their mucolytic effect, in comparison with the action of a physiological solution of NaCl used as a control.

These tests have shown that in this family of compounds, products which lower the viscosity from 20% to 40% after five minutes, from 30% to 55% after 10 minutes, from 35% to 60% after 15 minutes, are obtained. From among this series of derivatives and for very searching pharmacological and clinical tests, the 2-methylthiazolidine-4-carboxylic acid of the following developed formula (MG 238) was chosen:

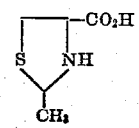

This is a white, odorless, relatively light, finely crystallized product; fusion point, 163°° C. to 164° C. (uncorrected). It is very soluble in water as well as in most alcohols, and other organic solvents. The product obtained by synthesis has an optically active form, providing the starting point is L-cysteine. A levogyrate form for this product is also obtained.

Toxicological action of compound MF 238

1. Acute toxicity.—The administration of doses less than 3000 mg./kg. produces no mortality in animals. The DL 50 under these conditions has no significance, the volume of the administered doses leading then rapidly to DL 100.

The subcutaneous administration of doses less than 2440 mg./kg. has no fatal effect on animals.

Intraperitonal administration of the compound in less than 2440 mg./kg. has no fatal effect on animals.

2. Subacute toxicity.—The chronic administration of compound MG 238 was carried out on the male Wistar rat, for one month and for three months. With doses of 100, 250 and 500 mg./kg. per day, no fatal effects were observed on all of the tested animals.

Determination of the blood formula and examination of the different organs removed showed no secondary effects from this substance.

Pharmacological activity of MG 238 "in vitro"

The mucolytic activity has been determined for different doses in comparison with a physiological solution of NaCl.

The values of viscosity in centipoises were immediately determined after five minutes, after ten minutes, and after fifteen minutes of contact between the substance and 2 ml. of sputum taken directly from chronic bronchitis patients.

These tests show that in comparison with a physiological solution of NaCl, MG 238 clearly lowered the viscosity from which the following indicative values were obtained:

|  | Percent | | | |
|---|---|---|---|---|
|  | Immediately | After 5 min. | After 10 min. | After 15 min. |
| Sol. NaCl | 100 | 100 | 100 | 100 |
| 30 mg | 71 | 62 | 60 | 51 |
| 50 mg | 49 | 48 | 40 | 40 |
| 100 mg | 36 | 32 | 30 | 30 |

It should be noted that these values were always recalculated in relation to an NaCl solution, fixed at 100% each time.

Pharmacological activity of MG 238 in animals

The product was orally administered in the proportion of 10 mg./kg. of bone to horses with chronic bronchitis and even in certain cases, with pulmonary emphysema. After 2 to 4 days of the treatment, according to the case, the disappearance of respiratory troubles was established.

Similarly and with the same doses, tests have ben carried out on dogs; similar results by administering the product orally, in the proportion of 10 mg./kg. of bone, were thus obtained.

The following compounds have also given encouraging results:

240: 2-ethylthiazolidine-4-carboxylic acid
241: 2-methylthiazolidine-4-carboxylate of 2-amino-2-thiazolidine
242: sodium 2-methylthiazolidine-4-carboxylate
243: 2-methyl-N-methylthiazolidine-4-carboxylic acid
244: 2-methylthiazolidine-4-carboxylic acid amide
245: 2-ethylthiazolidine-4-carboxylic acid amide
246: 2-methyl-N-methylthiazolidine-4-carboxylic acid amide
247: 2-methylthiazolidine-4-carboxylic acid N-methylamide
248: 2-ethylthiazolidine-4-carboxylic acid N,N-dimethylamide
249: methyl 2-methylthiazolidine-4-carboxylate
250: ethyl 2-ethylthiazolidine-4-carboxylate Pharmaceutical forms The product can be orally administered in the form of a powder, pills or bolus to human beings, these forms being obtained after mixing the active product with a certain number of excipients necessary to produce the pharmaceutical form, and with the concentration of the active constituents being, in general 100 mg.

For example, a pill comprises:

|  | Mg. |
|---|---|
| 2-methylthiazolidine-4-carboxylic acid | 100 |
| Milk sugar | 90 |
| Polyvinylpyrrolidone | 2 |
| Silicic acid | 1 |
| Corn starch | 46 |
| Magnesium stearate | 1 |
| Talc | 10 |
| Total for a pill | 250 |

Aqueous solutions can also be employed to carry out treatment by aerosol. Finally, the active product can also be administered as a suppository.

The active constituent can also be incorporated in solutions or suspensions in a mixture of other constituents, in order to obtain a therapeutic antitussive action. It can also be applied in sterile solutions for injections.

For example, a solution intended for injection comprises:

| | |
|---|---|
| 2-methylthiazolidine 4-carboxylic acid amide | mg__ 100 |
| Sodium chloride | mg__ 2.5 |
| Preservative distilled water q.s. ad | ml__ 1 |

The products with mucolytic activity are often administered from the therapeutic viewpoint, with antibiotics.

Therefore, examinations have been carried out, also "in vitro," to discover if the substance MG 238 inhibits the antibiotic activity of the oxytetracycline hydrochloride.

The results of these tests have shown that the association of MG 238 in variable quantities, also variable of oxytetracycline hydrochloride neither provokes an inhibition, nor a potentialization of the antibiotic activity.

Clinical tests

The clinical tests have been divided into three distinct groups:

A first group of 20 patients, suffering from chronic bronchial troubles, were treated with solutions of 5%, 10% and 20% of the active substance, by aerosol, in comparison to a saline solution.

The effect of the product, if not very clearly marked with a solution of 5% appears significant, however, and is almost the same with solutions of 10% and 20%. That is to say, a lowering of the viscosity of the sputum can be established and at the same time, an increase in its volume. It also appears that a solution of 20% increases the volume of the secretion too much which can at times provoke bronchial obstructions in patients having difficulty with expectoration.

The results of the second group of 10 patients will now be given in detail. In this case, a solution with 10% of the active substance was used always in comparison with the same volume of saline solution, namely 2×2 ml., per day (morning and evening).

This aerosol treatment produced the following average results with 10 patients:

|  | After— | | | | |
|---|---|---|---|---|---|
|  | 0 min. | 5 min. | 10 min. | 15 min. | 30 min. |
| Sol. NaCl 0.9% | 155 | 149.6 | 145.2 | 150.8 | 157.3 |
| Sol. 10% MG 238 | 173.2 | 112.4 | 90.1 | 73.5 | 61.2 |

At the same time a check was carried out and confirmed the results by histochemical determination of the ADN and sMPS filaments of the mucous.

Attention should be drawn to the fact that in other respects, no visible action was observed on the mucous membranes.

Finally, working with the third group of 20 patients with chronic bronchitis, the product was administered to ten cases in the form of 4 to 6 pills of 100 mg., and to the other 10 cases in the form of deep intramuscular injections of 3 ml., of a 20% solution, morning and evening, over a period of seven days, in comparison with 10 untreated sick control patients. Although slower to manifest itself and in lower proportions, the therapeutic effectiveness of the preparation was again demonstrated by the determination of the sputum viscosity and the measurement of its volume. Here, again, the histochemical analyses confirmed the result.

TREATMENT.—VISCOSITY MEASUREMENTS OF THE MUCOUS, CASE AVERAGE BY DAY—AFTER INITIAL TREATMENT

|  | 0 | 1 | 2 | 3 | 4 | 5 | 6 | 7 |
|---|---|---|---|---|---|---|---|---|
| None | 152.1 | 148.6 | 150.5 | 149.2 | 147.5 | 149.6 |  | 150.3 |
| Oral | 167.5 | 146.3 | 122.1 | 105.2 | 88.2 | 67.6 | 58.7 | 55 |
| I.m. | 171.4 | 132.1 | 95.3 | 71.4 | 62.3 | 52.2 |  |  |

A significant lowering in viscosity of the mucous in the two cases administered by intramuscular injection or orally, can thus be established. In the last case, however, the result is manifested more slowly and the treatment must be more prolonged. Finally, whether administered by normal means or by injection, if this is carried out quite slowly, the very good tolerance of the active substance should be mentioned.

What I caim as new asd desire to secure by Letters Patent is:

1. A method for lowering the viscosity of mucous in animals and humans which comprises administering to said animals and humans a therapeutic amount of a thiazolidine carboxylic acid of the formula,

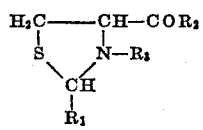

wherein
$R_1$ is hydrogen, or a lower alkyl group,
$R_2$ is hydroxy, lower alkoxy, amino mono-lower-alkylamino, di-lower alkyl amino or a 2-aminothiazolidine group, and
$R_3$ is hydrogen or lower alkyl.

2. A method according to claim 1 in which in said thiazolidine carboxylic acid,
$R_1$ is hydrogen, methyl or ethyl,
$R_2$ is hydrogen, amino, methylamino, dimethylamino, methoxy, ethoxy or 2-aminothizolidino, and
$R_3$ is hydrogen or methyl.

3. A method according to claim 1 in which 2-methylthiazolidine carboxylic acid is administered.

4. A method according to claim 1, in which said method is used for treatment of respiratory diseases.

5. A pharmaceutical composition in pill form having mucolytic and antitussive properties containing a thiazolidine carboxylic acid compound of the formula,

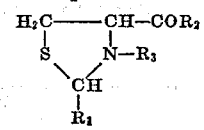

wherein
$R_1$ is hydrogen, or a lower alkyl group,
$R_2$ is hydroxy, lower alkoxy, amino mono-lower-alkylamino, di-lower-alkylamino, and
$R_3$ is hydrogen or lower alkyl,
in an amount of about 100 mg. per pill.

6. A pharmaceutical composition in injectable form having mucolytic and antitussive properties containing a thiazolidine carboxylic acid compound of the formula,

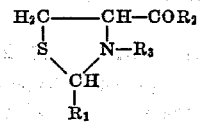

wherein
$R_1$ is hydrogen, or a lower alkyl group,
$R_2$ is hydroxy, lower alkoxy, amino mono-lower-alkylamino, di-lower-alkylamino, and
$R_3$ is hydrogen or lower alkyl,
in a concentration of about 20 to 50%.

7. A pharmaceutical composition according to claim 5, in which in said thiazolidine carboxylic acid
$R_1$ is methyl
$R_2$ is hydroxy, methoxy and amino
$R_3$ is hydrogen.

8. A pharmaceutical composition according to claim 5 in which in said thiazolidine carboxylic acid
$R_1$ is methyl
$R_2$ is hydroxy, methoxy and amino
$R_3$ is hydrogen.

References Cited

Chem. Abst., 59, pp. 591–2 (1903).

STANLEY J. FRIEDMAN, Primary Examiner